(12) United States Patent
Crisafulli

(10) Patent No.: US 7,190,945 B1
(45) Date of Patent: Mar. 13, 2007

(54) SECURITY ALARM OPERATION IN TELEPHONE DEVICE

(75) Inventor: George Crisafulli, Hatfield, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/553,282

(22) Filed: Apr. 20, 2000

(51) Int. Cl.
    *H04M 11/04* (2006.01)
(52) U.S. Cl. .............................. 455/404.1; 455/404.1; 455/404.2; 455/407; 455/408; 455/414.1
(58) Field of Classification Search ................. 379/35, 379/376, 447, 40, 433.02; 255/404; 340/628, 340/506
    See application file for complete search history.

(56) References Cited

U.S. PATENT DOCUMENTS

| | | | | |
|---|---|---|---|---|
| 3,710,024 A | * | 1/1973 | Lacey | 379/40 |
| 4,286,113 A | * | 8/1981 | Cronin | 379/35 |
| 4,365,238 A | * | 12/1982 | Kollin | 340/521 |
| 4,918,717 A | * | 4/1990 | Bissonnette et al. | 379/40 |
| 5,745,849 A | * | 4/1998 | Britton | 379/33 |
| 5,923,248 A | * | 7/1999 | Toledano et al. | 340/541 |
| 6,081,596 A | * | 6/2000 | Britto et al. | 379/428.04 |
| 6,101,253 A | * | 8/2000 | Lee et al. | 379/433.07 |
| 6,122,366 A | * | 9/2000 | Veschi | 379/373.02 |
| 6,150,943 A | * | 11/2000 | Lehman et al. | 340/628 |
| 6,366,648 B1 | * | 4/2002 | Carney | 379/41 |
| 6,452,490 B1 | * | 9/2002 | Garland et al. | 340/506 |

* cited by examiner

*Primary Examiner*—Jean Gelin
*Assistant Examiner*—David Q Nguyen

(57) ABSTRACT

An apparatus and technique for providing a monitoring alarm telephone which not only automatically dials a predetermined alarm notification telephone number upon activation of a suitable alarm device (e.g., tripping of a motion detector), but which also provides audible monitoring of the secured premises using the automatically dialed telephone call. In one embodiment, an open channel is established between the monitoring alarm telephone and a called telephone allowing sounds from the secured premises to be passed on to the called party. A silent monitoring alarm is provided by muting the speaker of the monitoring alarm telephone upon activation of the alarm device. In another embodiment, a cordless telephone includes a motion detector and forms a monitoring alarm telephone. The microphone of either the remote handset or the base unit may be used to provide the monitored sounds to the automatically called party. Alternatively, sounds picked up by both the microphone in the remote handset and the microphone in the base unit may be combined (e.g., conferenced) and provided over the automatically established telephone call to provide flexible and thorough audible monitoring of the secured premises.

5 Claims, 3 Drawing Sheets

SECURITY ALARM OPERATION IN TELEPHONE DEVICE

BACKGROUND OF THE INVENTION

1. Field of the Invention

This invention relates generally to security alarm systems. More particularly, it relates to the integration of a security alarm system in a telephone or other customer premises equipment.

2. Background of Related Art

Many homes have security systems. More modern security systems detect an intrusion into a particular area or through a particular door or window, then automatically report that intrusion to a security company (or directly to the police).

For instance, U.S. Pat. No. 5,923,248 to Toledano et al. discloses an alarm telephone in communication with a motion detector. Upon detection of an intrusion determined by the detection of movement in a secured area, the alarm telephone dials a predetermined telephone number and delivers a predetermined code to the called party (e.g., a called security alarm company computer system).

U.S. Pat. No. 5,745,849 to Britton discloses another conventional alarm system in communication with a motion detector. According to this patent, a cordless telephone includes a premise monitoring alarm system including a motion detector. Upon detection of motion or other alarming event, the base unit of the cordless telephone sends an alarm warning to a central alarm-monitoring station. If a call is currently in progress using the cordless telephone during the alarm event, the base unit will hang up the telephone call in progress and call up the central alarm monitoring station and provide an alarm message that includes an alarm code for the given alarm event, an account number for the given premise, etc. Alternatively, if a call is in progress when the alarm event occurs, the base unit of the cordless telephone can utilize a second telephone line, if available.

Such alarm systems are usually associated with a service contract from an alarm company which staffs a telephone and/or computer system monitoring incoming alarm calls. Unfortunately, alarm company service contracts are typically expensive and prone to serious circumstances. For instance, many municipalities impose fines upon users of alarm systems when a false alarm causes police to dispatch to the home.

There is a need for an inexpensive alarm system which does not require a call-up to an alarm company's monitoring system. Moreover, there is need for a motion detecting alarm system which can provide more detailed information regarding a secured premises beyond that typically provided by the activation of a motion detector.

SUMMARY OF THE INVENTION

In accordance with the principles of the present invention, a monitoring alarm telephone comprises a telephone functionality module, and a security alarm device. An automatic dialer module automatically dials a predetermined telephone number upon activation of the security alarm device. A microphone is in communication with the telephone functionality module. The microphone relays sounds audible in a vicinity of the security alarm device in response to the activation of the security device.

A method of providing a monitoring alarm telephone in accordance with another aspect of the present invention comprises monitoring a security of a room from a monitoring alarm telephone. A telephone call to a predetermined telephone number is automatically dialed and established upon activation of a security device indicating a breach of security. Audible sounds from the room are provided over the established telephone call.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to an apparatus and technique for providing a monitoring alarm telephone which not only automatically dials a predetermined alarm notification telephone number upon activation of a suitable alarm device (e.g., tripping of a motion detector), but which also provides audible monitoring of the secured premises using the automatically dialed telephone call.

For instance, in accordance with the principles of the present invention, an open channel is established between the monitoring alarm telephone and a called telephone allowing sounds from the secured premises to be passed on to the called party.

Figure 1:
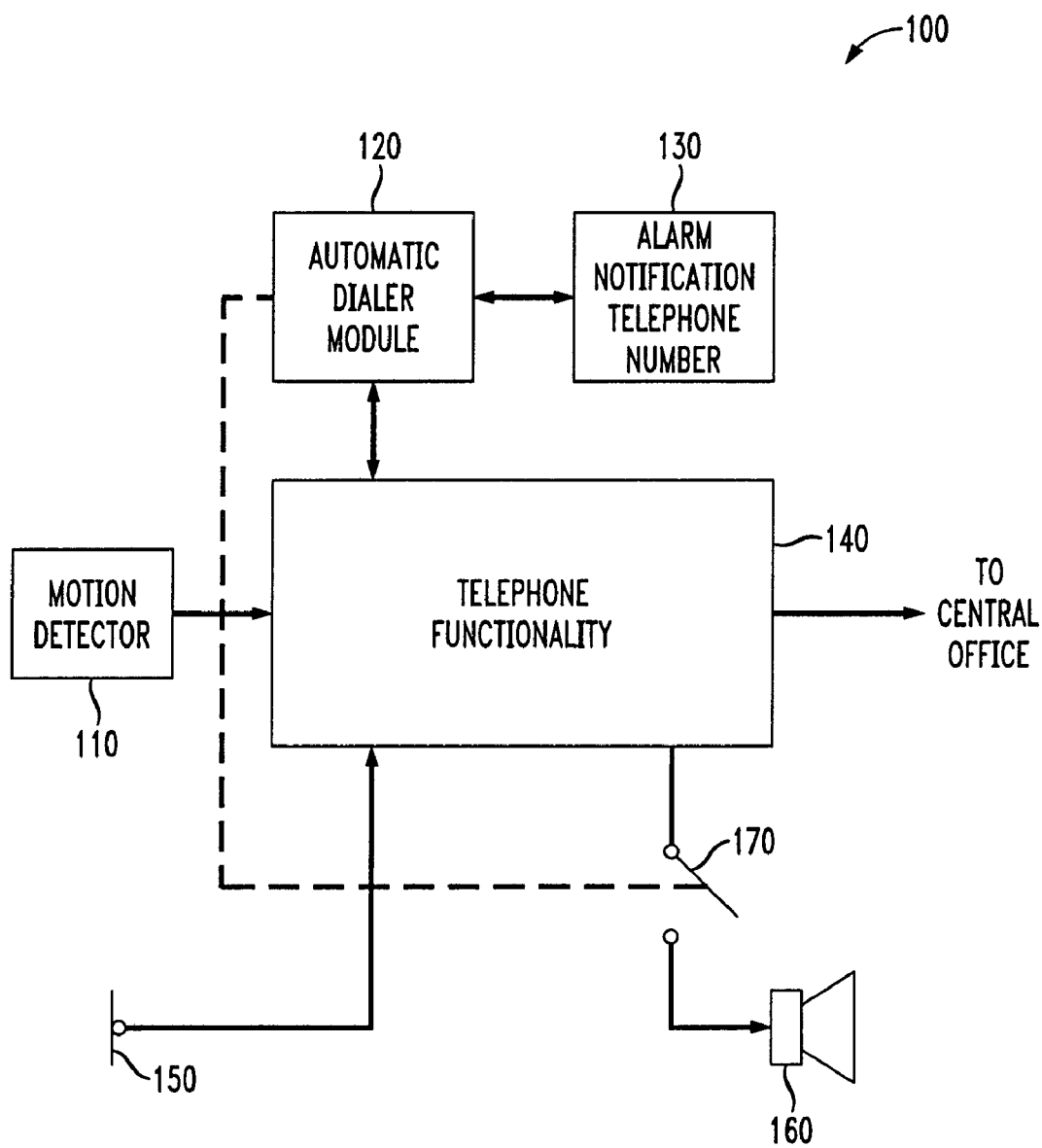
FIG. 1 shows an embodiment of a monitoring alarm telephone in a telephone including a motion detector and which calls a predetermined alarm notification telephone number upon activation of the motion detector and allows audible monitoring of the secured premises, in accordance with the principles of the present invention.

FIG. 1 shows an embodiment of a monitoring alarm telephone in a telephone including a motion detector and which calls a predetermined alarm notification telephone number upon activation of the motion detector and allows audible monitoring of the secured premises, in accordance with the principles of the present invention.

In particular, as shown in FIG. 1, a monitoring alarm telephone 100 includes telephone functionality 140 otherwise conventional in a corded telephone, along with a suitable telephone line interface (TLI) for communication with a central office.

The telephone functionality module 140 includes a telephone line interface (TLI), and a suitable processor (e.g., a microcontroller, a microprocessor, or a digital signal processor (DSP)).

A microphone 150 and a speaker 160 are provided, either in a handset and/or in the base of the monitoring alarm telephone 100.

The monitoring alarm telephone 100 includes an alarm input device capable of detecting intrusion into a particular area secured by the monitoring alarm telephone. In the disclosed embodiments, the alarm input is provided by an integrated motion detector 110 in the base of the monitoring alarm telephone 100. Preferably, the motion detector 110 is mounted in the base of the monitoring alarm telephone 100 such that it can be positioned toward any particularly desired portion of the secured area.

While a motion detector is particularly shown and described, the principles of the present invention relate equally to other types of alarm input devices, e.g., contact closure type devices adapted to detect intrusion through doors or windows. Moreover, the alarm input device may be a fire detector, or carbon monoxide detector.

The motion detector is preferably powered by AC power provided to the monitoring alarm telephone 100. However, the motion detector or other alarming device may be powered from the telephone line using a suitable line powered device.

As shown in FIG. 1, upon activation of the particular alarming device (e.g., upon detection of motion by the motion detector 110), an automatic dialer module 120 automatically causes the telephone to go off-hook. The automatic dialer module retrieves an alarm notification telephone number from an appropriate memory area, and upon receipt of a dial tone over the telephone line from the central office, the automatic dialer module 120 automatically dials the predetermined alarm notification telephone number.

User may pre-program a desired telephone number into the alarm notification telephone number memory. The alarm notification telephone number may be any telephone number preprogrammed and pre-configured by the user. The user may input the alarm notification telephone number upon prompting by a central processor through an appropriate display and keyboard during initial installation and configuration of the monitoring alarm telephone.

When the called party associated with the alarm notification telephone number 130 answers the automatically dialed alarm telephone call, the called party is presented with an open channel to the audible sounds picked up by the microphone 150.

The present invention, while providing sounds of a breached secured area to a called party, can nevertheless be implemented as a 'silent' alarm. For instance, preferably, but not necessarily, the speaker 160 may be disabled at the monitoring alarm telephone so as to prevent detection by the intruder that a security call has been made. The speaker 160 may be disabled using a switching mechanism 170, or simply by disabling (e.g., tri-stating) a communication signal to the speaker 160.

Similarly, all audible sounds related to the automatic dialing of a predetermined telephone number (e.g., the receipt of dial tone from the central office, the output of dual tone, multiple frequency (DTMF) tones onto the telephone line, etc.) may preferably be muted at the monitoring alarm telephone to further perfect the implementation of a 'silent monitoring alarm'.

It may also be desirable to disable any otherwise visible and/or audible indications that the monitoring alarm telephone has been taken off hook, to even further perfect the 'silent monitoring alarm' functionality of the monitoring alarm telephone.

Figure 2:
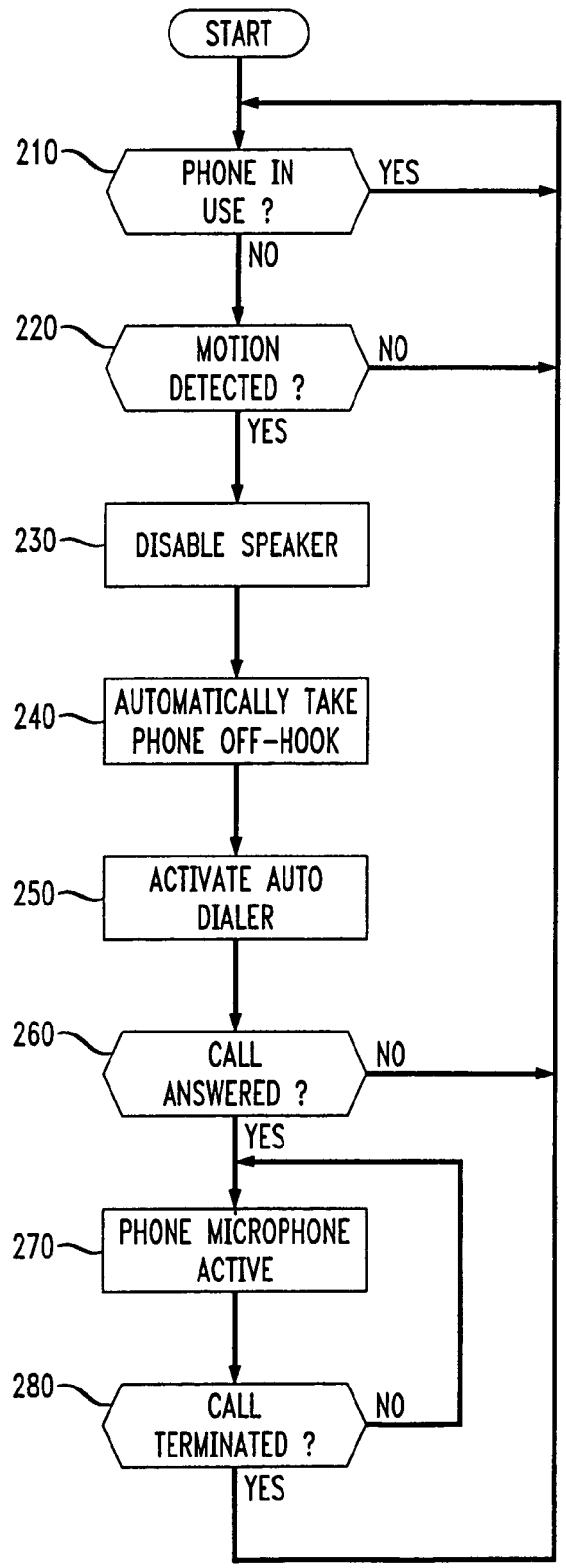
FIG. 2 shows an exemplary process by which the monitoring alarm telephone shown in FIG. 1 detects motion and implements a silent monitoring alarm by automatically dialing the alarm notification telephone number and allowing audible monitoring of the secured premises by the called party, in accordance with the principles of the present invention.

FIG. 2 shows an exemplary process by which the monitoring alarm telephone shown in FIG. 1 detects motion and implements a silent monitoring alarm by automatically dialing the alarm notification telephone number and allowing audible monitoring of the secured premises by the called party, in accordance with the principles of the present invention.

In particular, as shown in step 210 of FIG. 2, the monitoring alarm telephone 100 determines if the telephone line is currently in use. If the monitoring alarm telephone 100 is in use, it is presumed that there is no alarming situation, and the process enters a non-alarm event state, e.g., an endless loop.

In step 220, the monitoring alarm telephone 100 determines if motion has been detected by the motion detector 110. If so, the process of FIG. 2 proceeds. If not, the non-alarm event state is entered.

In step 230, the speaker is disabled using, e.g., a switching mechanism 170, disabling of an appropriate audio or digital component in the speaker path, etc., to implement a silent monitoring alarm feature in the monitoring alarm telephone 100.

in step 240, the telephone line interface in the telephone functionality 140 of the monitoring alarm telephone 100 is caused by the automatic dialer module 120 to place the telephone line in an off-hook condition (e.g., by drawing a suitable amount of current from the telephone line).

In step 250, the telephone number contained in the alarm notification telephone number memory 130 is automatically dialed by the automatic dialer module 120.

In step 260, the automatic dialer module 120 senses when the automatically placed alarm telephone call is answered by the called party. If the call is not answered within a predetermined time period (e.g., after 8 rings), the process may end. Alternatively, a delay may be instituted before retrying the automatically dialed telephone number, and the call attempted again. Multiple attempts may be made before ending the process.

In step 270, the monitoring alarm telephone 100 either activates or maintains active the microphone 150 such that sounds reaching the microphone 150 either on the handset or the base of the monitoring alarm telephone 100 may be heard by the called party.

In step 280, the monitoring alarm telephone 100 waits and senses for termination of the telephone call by the called party. If the call is not terminated, the microphone remains open. However, once the call is terminated by the called party, the process shown in FIG. 2 may be ended.

Figure 3:
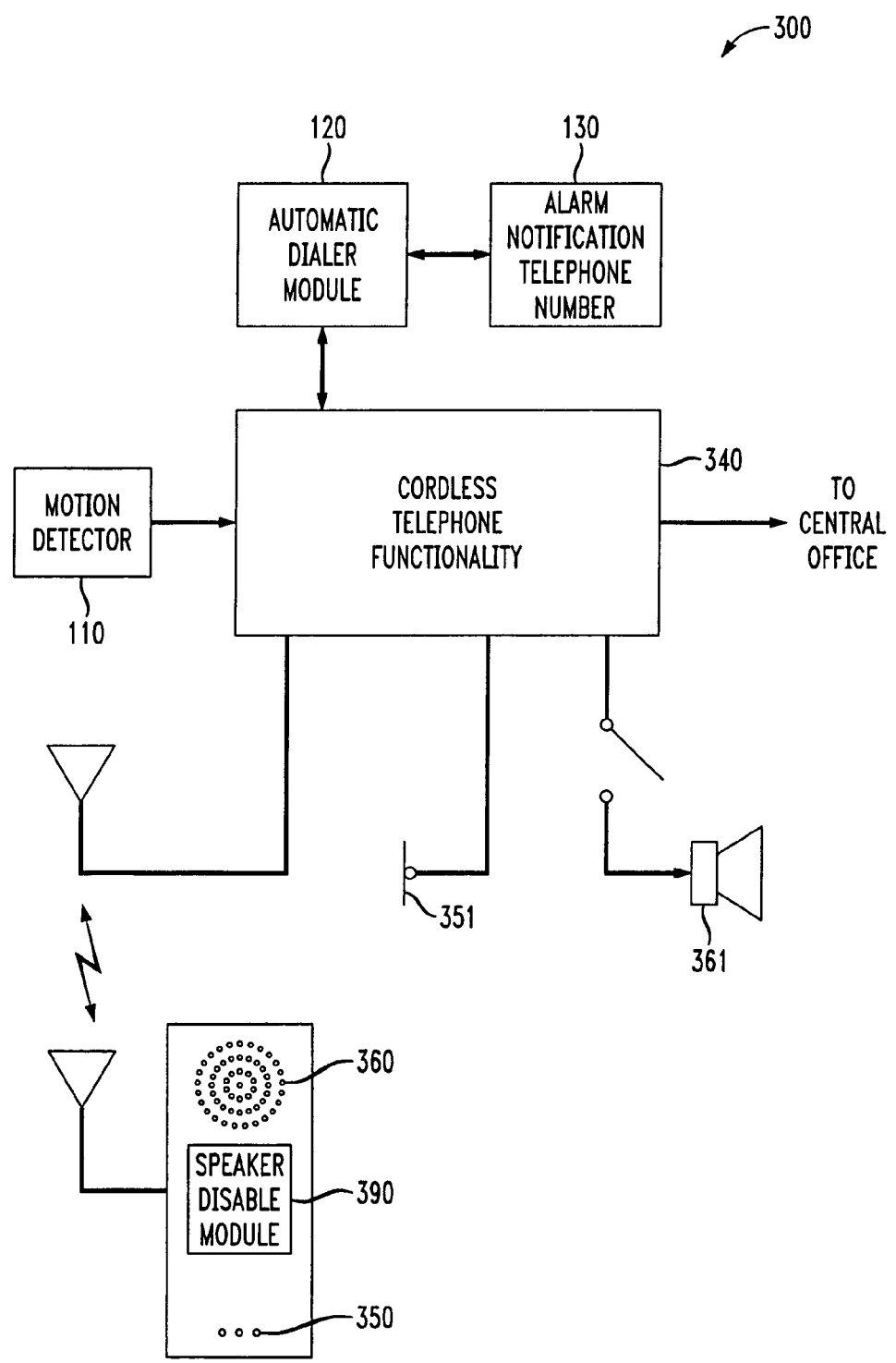
FIG. 3 shows another embodiment of a monitoring alarm telephone in a cordless telephone including a motion detector and which calls a predetermined alarm notification telephone number upon activation of the motion detector and allows audible monitoring of the secured premises, in accordance with the principles of the present invention.

FIG. 3 shows another embodiment of a monitoring alarm telephone in a cordless telephone including a motion detector and which calls a predetermined alarm notification telephone number upon activation of the motion detector and allows audible monitoring of the secured premises, in accordance with the principles of the present invention.

In particular, as shown in FIG. 3, the features of the corded monitoring alarm telephone 100 shown in FIG. 1 are implemented in a cordless telephone. The features and functions in the cordless monitoring alarm telephone 300 shown in FIG. 3 are as shown and described with respect to the corded monitoring alarm telephone 100 shown in FIG. 1, with the exception that the microphone utilized for monitoring of the secured premises may be either the microphone 350 in the remote handset or the microphone 351 in the base unit. The selection as to which microphone provides monitored input may be pre-configured by the user upon installation of the cordless monitoring alarm telephone 300. Alternatively, the microphone selection may be made based on the input of a control command input to an alphanumeric or other keypad on either the remote handset or the base unit.

It is also within the principles of the present invention to conference the input from both microphones 350 and 351 for presentation to the called party, providing a more flexible and encompassing range of monitoring capability.

Preferably, both the speaker 361 in the base unit and the speaker 361 in the remote handset are disabled or otherwise muted upon the detection of an alarming event, to implement a silent alarm monitoring feature in accordance with the principles of the present invention.

The monitoring alarm feature of the monitoring alarm telephone may be armed in any suitable fashion, e.g., by depression of a particular key or sequence of keys on a keypad of the monitoring alarm telephone. Alternatively, the monitoring alarm feature may be activated remotely (e.g., when calling in for messages) using DTMF encoded commands in a known fashion. Thus, upon remote call-in and entry of a suitable password, the user may activate the microphone and listen to sounds in the premises surrounding the security alarm telephone device. In this call-in mode, the microphone sounds may be activated whether or not a security device (e.g., a motion detector) has been recently tripped.

Accordingly, an inexpensive home security device is provided which calls the user at a given number (e.g., at work, etc.) when way from the secured home in the event of the detection of a breach of security (e.g., motion in the room containing the monitoring alarm telephone). Early notification of a burglary or other intrusion into one's home can be provided with a monitoring alarm telephone in accordance with the principles of the present invention.

The present invention relates not only to corded and cordless telephones as shown, but also to telephone answering devices, and customer premises equipment in general.

With a security alarm telephone device in accordance with the principles of the present invention, a user may hear sounds within the premises of a secured area, including audible alarm sounds such as a smoke detector, carbon monoxide detector, etc.

While the invention has been described with reference to the exemplary embodiments thereof, those skilled in the art will be able to make various modifications to the described embodiments of the invention without departing from the true spirit and scope of the invention.

What is claimed is:

1. A method of providing a monitoring alarm telephone comprising:
    monitoring a security of a room from a monitoring alarm telephone;
    upon activation of a security device indicating a breach of security, automatically dialing and establishing a telephone call to one predetermined telephone number, said predetermined telephone number not limited to an alarm monitoring service;
    providing audible sounds from said room over said established telephone call, said audible sounds being picked up by a microphone in a base unit of a cordless telephone;
    providing another microphone comprised in a remote handset of said cordless telephone;
    wherein audible sounds picked up from both said microphone in said base unit and said another microphone in said remote handset are combined and provided over said established telephone call.

2. A method of providing a monitoring alarm telephone, comprising:
    monitoring a security of a room with a security alarm device from a monitoring alarm telephone;
    automatically dialing with an automatic dialer module and establishing a telephone call with a telephone line interface to a predetermined telephone number upon activation of a security device indicating a breach of security;
    providing audible sounds with a microphone from said room over said established telephone call upon said activation of said security device; and
    silencing audio received in connection with said established telephone call;
    wherein said telephone line interface, said automatic dialer module, and said microphone are integrated with said monitoring alarm telephone, said monitoring alarm telephone being operable to allow a user to initiate and receive telephone calls.

3. The method of providing a monitoring alarm telephone according to claim 2, wherein said received audio includes:
    voice signals;
    dial tone; and
    DTMF tones.

4. Apparatus for providing a monitoring alarm telephone, comprising:
    means for monitoring a security of a room with a security alarm device from a monitoring alarm telephone;
    means for automatically dialing with an automatic dialer module and establishing a telephone call with a telephone line interface to a predetermined telephone number upon activation of a security device indicating a breach of security;
    means for providing, upon said activation of said security device, audible sounds with a microphone from said room over said established telephone call; and
    means for silencing audio received in connection with said established telephone call;
    wherein said telephone line interface, said automatic dialer module, and said microphone are integrated with said monitoring alarm telephone, said monitoring alarm telephone being operable to allow a user to initiate and receive telephone calls.

5. The apparatus for providing a monitoring alarm telephone according to claim 4, wherein said received audio includes:
    voice signals;
    dial tone; and
    DTMF tones.

* * * * *